United States Patent [19]

Iijima et al.

[11] 4,381,074

[45] Apr. 26, 1983

[54] AIR-CONDITIONING METHOD AND SYSTEM FOR AN AUTOMOTIVE VEHICLE

[75] Inventors: Tetsuya Iijima, Yamato; Seiichi Takahashi, Tokyo, both of Japan

[73] Assignee: Nissan Motor Company, Limited, Yokohama, Japan

[21] Appl. No.: 317,865

[22] Filed: Nov. 3, 1981

[30] Foreign Application Priority Data

Nov. 4, 1980 [JP] Japan ................................. 55-153718

[51] Int. Cl.³ .......................... G05D 23/00; B60H 3/00
[52] U.S. Cl. .................................... 236/13; 236/91 R; 165/43
[58] Field of Search ...................... 236/13, 91 R, 91 C, 236/91 D, 49; 165/16, 41, 42, 43

[56] References Cited

U.S. PATENT DOCUMENTS

| | | | |
|---|---|---|---|
| 4,289,272 | 9/1981 | Murase et al. | 236/91 D |
| 4,311,188 | 1/1982 | Kojima et al. | 165/43 |
| 4,344,565 | 8/1982 | Kojima et al. | 236/91 C |
| 4,345,714 | 8/1982 | Kojima et al. | 236/91 C |

Primary Examiner—Albert J. Makay
Assistant Examiner—Harry Tanner
Attorney, Agent, or Firm—Lowe, King, Price & Becker

[57] ABSTRACT

An air-conditioning method and system for an automotive vehicle according to the present invention automatically maintains the temperature of air within the passenger compartment at a value preset by a passenger compartment air temperature presetting device and adjusted to a comfortable temperature which varies according to the outside-air temperature in accordance with a predetermined relationship defined by three linear functions having two points of intersection. The method comprises the steps of calculating a basic outlet duct air temperature, calculating an outlet duct air temperature correction, adding the two calculated values, and calculating an air mix door opening percentage, in addition to calculating a comfortable passenger compartment air temperature.

12 Claims, 8 Drawing Figures

AIR-CONDITIONING METHOD AND SYSTEM FOR AN AUTOMOTIVE VEHICLE

BACKGROUND OF THE INVENTION

1. Field of the Invention

The present invention relates to an air-conditioning method and system used for an automotive vehicle, and more specifically to the air-conditioning method and system in which air temperature at which the passenger compartment is maintained is automatically adjusted to match variations in the passengers' perception of comfortable temperature according to the seasons.

2. Description of the Prior Art

Recently, automotive vehicles have been provided with an air conditioner which can maintain air temperature within the passenger compartment at an appropriate temperature.

In a prior-art air-conditioning system, air is drawn in through an air intake duct by a blower fan and is cooled by a cooling unit. After being cooled, one part of the introduced air is heated by a heating unit and is proportioned with the other unheated part of the introduced air by an air mix door in order to maintain the air within the passenger compartment in a desired temperature. Further, in this case, an air intake door is usually provided in order to selectably effect outside-air introduction or inside-air recirculation. The outside-air introduction mode is used for refreshing the air within the passenger compartment with fresh air and the inside-air recirculation mode is used for cooling or heating the air within the passenger compartment efficiently.

In the air-conditioner as described above, the air mix door is opened or closed by an air mix door actuator, which is controlled by two solenoid valves. The solenoid valves are energized by using a bridge circuit including various resistors of a passenger compartment air temperature sensor, an outside-air temperature sensor, an air mix door opening percentage sensor, a passenger compartment air temperature presetting variable resistor, fixed resistors, etc.

It is well known that the passenger compartment temperature at which a passenger will be comfortable will tend to be a little lower in summer and a little higher in winter. In order to adjust the temperature accordingly in the prior-art air conditioner, it is necessary to change the presetting of the respective comfortable temperature ranges within the passenger compartment in summer and winter by adjusting a temperature presetting lever; however, the required degree of correction is not known to the driver, and also so it is troublesome to move the temperature presetting lever in order to re-preset the temperature.

A more detailed description of the prior-art air conditioning system will be made hereinafter with reference to the attached drawings under DETAILED DESCRIPTION OF THE PREFERRED EMBODIMENTS.

SUMMARY OF THE INVENTION

With these problems in mind therefore, it is the primary object of the present invention to provide an air-conditioning method and system for controlling the air within the passenger compartment to be at a comfortable temperature according to the outside-air temperature.

To achieve the above mentioned objects, the air-conditioning method of controlling the passenger compartment air at a comfortable temperature according to the outside air temperature includes step by which a comfortable passenger compartment air temperature $T_O'$ is calculated on the basis of the outside-air temperature $T_A$ and the desired preset passenger compartment air temperaure $T_O$ in accordance with a predetermined relationship defined by three linear functions having two points of intersection, next the basic outlet duct air temperature $T_{ACO}$ is calculated on the basis of the calculated comfortable passenger compartment air temperature $T_O'$ and the detected outside-air temperature $T_A$ in accordance with a first equation, thirdly an outlet duct air temperature correction $\Delta T$ is calculated on the basis of the calculated comfortable passenger compartment air temperature $T_O'$ and the detected passenger compartment air temperature $T_P$ in accordance with a second equation, fourthly the calculated basic outlet duct air temperature $T_{ACO}$ and the calculated outlet duct air temperature correction $\Delta T$ are added to obtain the target outlet duct air temperature $T_{AC}$, fifthly the added target outlet duct air temperature $T_{AC}$ and the passenger compartment air temperature $T_P$ are compared with the predetermined relationships of outlet duct air temperature $T_{AC}$ and passenger compartment air temperature $T_P$ to air mix door opening percentage X, sixthly the obtained air mix door opening percentage X is compared with the detected air mix door opening percentage X', and lastly the air mix door position is adjusted according to the difference between the values of X and X'.

To achieve the above-mentioned objects, the air-conditioning system of controlling the passenger compartment air at a comfortable temperature according to the outside air temperature comprises various sensors, such as an outside air temperature sensor, a passenger compartment air temperature sensor and an air mix door opening percentage sensor, a passenger compartment air temperature preset device, and an arithmetic control unit including a preset passenger compartment air temperature correction unit, a basic outlet duct air temperature calculating unit, an outlet duct air temperature correction calculating unit, an adder, an air mix door open percentage calculating unit, in addition to a comparator, an actuator, etc.

BRIEF DESCRIPTION OF THE DRAWINGS

The features and advantages of the air-conditioning method and system for controlling the air within the passenger compartment to be at a comfortable temperature determined by the outside-air temperature according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

To facilitate understanding of the present invention, a brief reference will be made to a prior-art air-conditioning system with reference to the attached drawings.

Figure 1:
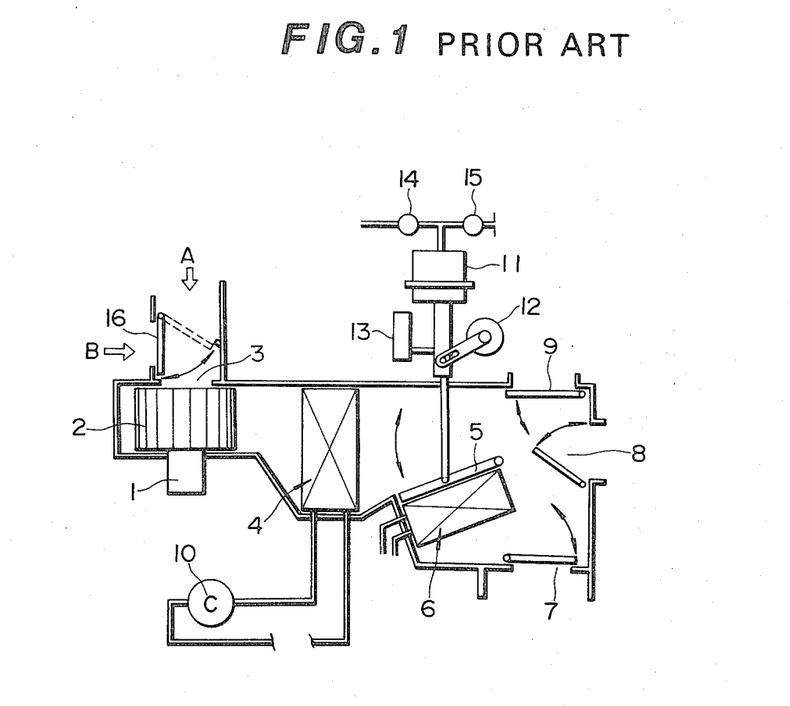
FIG. 1 is a diagramic illustration or a prior-art air conditioning system.

FIG. 1 shows a diagrammatical illustration of a sample prior-art air-conditioning system. In this system, air is drawn in through an air intake duct 3 by a blower fan 2 driven by a motor 1 and is cooled by a cooling unit 4. After being cooled, one part of the introduced air is heated by a heating unit 6 and is mixed in proportion to the other unheated part of introduced air according to the opening percentage of an air mix door 5, and lastly output from a number of air outlet ducts 7, 8, and 9 into the passenger compartment. The reference numeral 10 denotes a compressor, the numeral 11 denotes an actuator for positioning the air mix door 5, the numeral 12 denotes a sensor for detecting the opening percentage of the air mix door, the numeral 13 denotes a slide switch linked to the air mix door, and the numerals 14 and 15 denote solenoid valves to activate the actuator 11. That is, the numeral 14 denotes a solenoid valve to introduce a vacuum pressure in the engine intake manifold into the actuator 11 to change the air mix door opening percentage in one direction, and the numeral 15 denotes a solenoid valve to release the pressure of the actuator 11 to atmospheric pressure to change the air mix door opening percentage in the opposite direction. The source of air drawn in by the blower fan 2 is determined by an air intake door 16. In the case where the door 16 is located as shown by the solid lines in FIG. 1, only outside air is introduced into the blower fan 2 as shown by the arrow A in FIG. 1. In this case, the air within the passenger compartment is refreshed with fresh air, which is called the outside-air introduction mode. In the case where the door 16 is located as shown by the dashed lines in FIG. 1, only inside air is introduced into the blower fan 2 as shown by the arrow B in FIG. 1. In this case, the air recirculated from within the passenger compartment is efficiently cooled or heated, which is called the inside-air recirculation mode.

Figure 2:
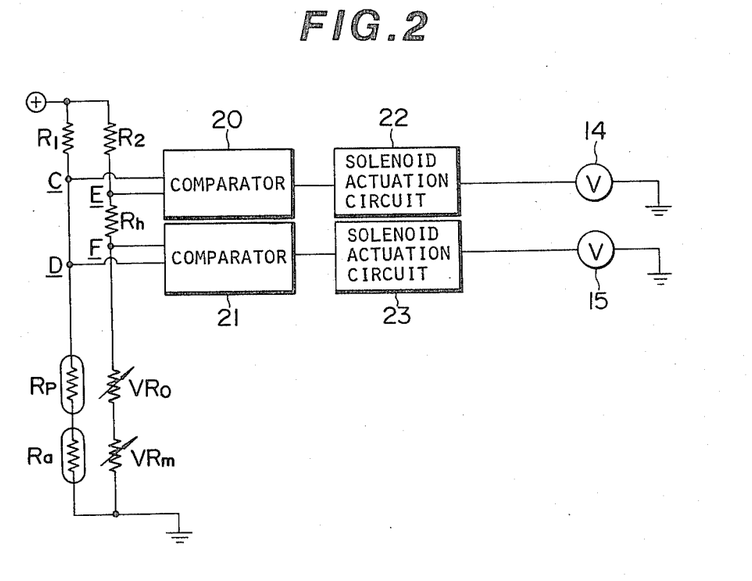
FIG. 2 is a schematic block diagram of a controller used with the prior-art air conditioning system.

The above-mentioned air conditioning system is conventionally controlled by a bridge circuit as shown in FIG. 2. The bridge circuit comprises a passenger compartment air temperature sensor $R_p$, an outside-air temperature sensor $R_a$, a first fixed resistor $R_1$, a second fixed resistor $R_2$, a passenger compartment air temperature presetting variable resistor $VR_o$, a variable resistor $VR_m$ used for the air mix door opening percentage sensor, and a fixed resistor $R_h$ across which an output voltage is taken.

Pairs of connection points C and E, and D and F are connected to two comparators 20 and 21 respectively.

When a potential difference is generated between the connection points C and E, the solenoid valve 14 is actuated by a solenoid valve actuation circuit 22, so that vacuum pressure is introduced into the actuator 11 of FIG. 1. On the other hand, when a potential difference is generated between the connection points D and F, the solenoid valve 15 is actuated by a solenoid valve actuation circuit 23, so that vacuum pressure is relieved from the actuator 11 of FIG. 1. In response to the movement of the actuator 11, the opening percentage of the air mix door 5 is adjusted.

It is well known that the passenger compartment temperature at which passenger will be comfortable will tend to be a little lower in summer and to a little higher in winter. In order to perform the above-mentioned temperature adjustment in the prior-art air conditioner, it is necessary to change the presetting of the respective comfortable temperature ranges within the passenger compartment for summer and winter by moving a temperature presetting lever; however, the required degree of correction is not known to the driver, and also it is troublesome to move the temperature presetting lever in order to re-preset the temperature.

To overcome these problems, since it is known that the output from the above-mentioned bridge circuit can be corrected according to change in outside-air temperature by connecting a resistor in series or in parallel with the outside-air temperature sensor, it is possible to consider that separate bridge circuits used for summer, winter, and spring or autumn are provided for the air conditioner in order to obtain the respective different temperature control characteristics. In this case, however, since the circuit configuration will be complicated, there inevitably exists a limit of accuracy for the air conditioner in the prior-art bridge circuit. Therefore, it is impossible to accurately and economically maintain the temperature within the passenger compartment at a comfortable level in all seasons.

The following is a description of the present invention with reference to the attached drawings.

First, heat quantity equilibrium is explained hereinbelow, which is the basic concept of the present invention.

In order to maintain the temperature within the passenger compartment at a constant level, the heat quantity $Q_{AC}$ supplied by an air conditioning system must be equal to the thermal load applied to the vehicle (solar heat, outside air, ventilation, passengers' body heat, engine, etc.). Therefore, an equilibrium equation is obtained as follows:

$$Q_{AC}=Q_T+Q_V+Q_S+Q_M+Q_I \qquad (1)$$

where $Q_T$ is the heat quantity absorbed into or radiated from the passenger compartment due to the difference in temperature between outside air and inside air, $Q_V$ is the heat quantity introduced thereinto or discharged therefrom due to ventilation, $Q_S$ is the heat quantity absorbed thereinto as solar heat, $Q_M$ is the heat quantity radiated by passengers, and $Q_I$ is the heat quantity radiated from equipment within the vehicle, such as an engine. The above-mentioned heat quantity $Q_{AC}$ to be supplied to the passenger compartment is determined by the difference in temperature between air outputted from an air conditioning system $T_{AC}$ and air within a passenger compartment $T_P$. The thermal loads $Q_T$ and $Q_V$ are determined by the difference in temperature between outside air $T_A$ and inside, that is passenger compartment air $T_P$. The solar heat temperature $T_S$ is determined by incident solar energy. Accordingly, since $Q_M$ and $Q_I$ are roughly constant, it is also possible to express the above equation (1) as another temperature equilibrium equation as follows:

$$T_{AC} = aT_P + bT_A + cT_S + d \quad (2)$$

wherein $T_{AC}$ is the target temperature of air output from an air conditioning system, $T_P$ is the passenger compartment air temperature, $T_A$ is the outside-air temperature, $T_S$ is the expectable increase of passenger compartment temperature due to solar heat, and a, b, c and d are constants. Now, if the temperature of air output from the air conditioning system when a passenger compartment air temperature $T_P$ reaches a preset temperature $T_O$ is considered as a basic outlet duct air temperature $T_{ACO}$, the following equation can be obtained from Equation (2), because $T_P$ is $T_O$:

$$T_{ACO} = aT_O + bT_A + cT_S + d \quad (3)$$

By comparing equations (2) and (3), it is possible to characterize the target outlet duct air temperature $T_{AC}$ as follows:

$$T_{AC} = T_{ACO} + \Delta T \quad (4)$$

where $$\Delta T = a(T_O - T_P) \quad (5),$$

$\Delta T$ being called the outlet duct air temperature correction.

In the air-conditioning method according to the present invention, the above-mentioned basic outlet duct air temperature $T_{ACO}$ is calculated in accordance with the above equation (3). In this case, however, a comfortable passenger compartment air temperature $T_O'$ calculated by a preset temperaure correction unit is substituted into the preset passenger compartment air temperature $T_O$. As described in more detail later, the comfortable passenger compartment air temperature $T_O'$ is the value of the preset air temperature $T_O$ adjusted in inverse proportion to outside air temperature $T_A$, so that changes in passenger perception of comfort are taken into account automatically. The outside air temperature $T_A$ and the passenger compartment air temperature $T_P$ are actually detected by respective temperature sensors. On the other hand, the passenger compartment air temperature increase $T_S$ due to solar heat and constants a, b, c and d are all fixed and previously stored in an appropriate memory unit.

Figure 3A:
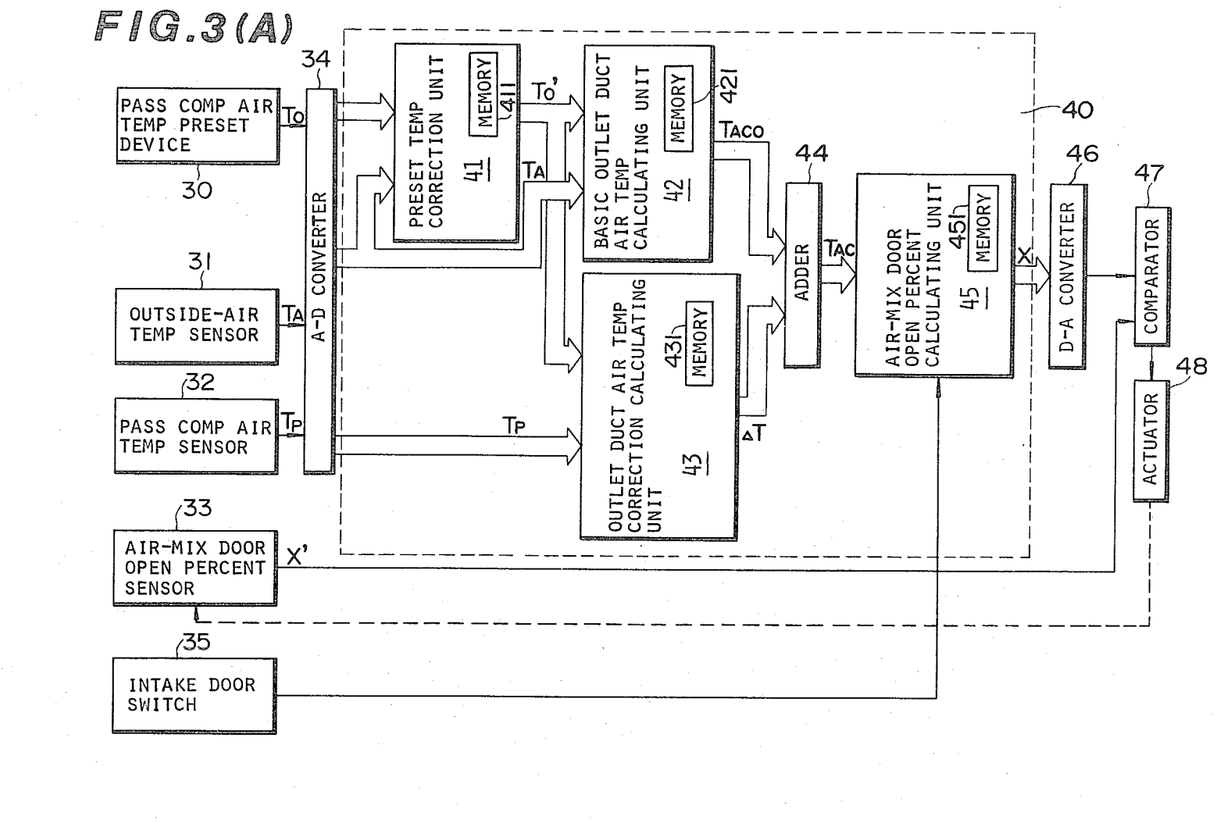
FIG. 3(A) is a schematic block diagram of a first embodiment of the air-conditioning system for controlling the temperature within the passenger compartment at a comfortable temperature according to the outside-air temperature of the present invention.

In view of the above description, reference is now made to FIGS. 3-6, and more specifically to FIG. 3(A).

FIG. 3(A) shows a schematic block diagram of a first embodiment of an air conditioning system according to the present invention. In the figure, the numeral 30 denotes a passenger compartment air temperature presetting device outputting a signal $T_O$, the reference numeral 31 denotes an outside-air temperature sensor outputting a signal $T_A$, the numeral 32 denotes a passenger compartment air temperature sensor outputting a signal $T_P$. The reference numeral 33 denotes an air mix door opening percentage sensor for detecting the opening percentage of the air mix door of FIG. 1 and outputting a signal $X'$ indicative thereof. The numeral 34 denotes an analog-digital converter to convert the outside-air temperature signal $T_A$, the passenger compartment air preset temperature signal $T_O$, and the passenger compartment air temperature signal $T_P$, to corresponding digital signals.

The numeral 35 denotes an air intake door switch for detecting whether the air conditioner is operating in outside air introduction mode or inside air recirculation mode. The signal from this switch can be produced as a single digital bit signal.

The numeral 40 denotes an arithmetic control unit which includes various units as follows:

The reference numeral 41 denotes a preset temperature correction unit including a first memory unit 411 to correct the temperature $T_O$ preset by the passenger compartment air temperature presetting device 30 to an appropriate comfortable passenger compartment air temperature $T_O'$ on the basis of the outside-air temperature $T_A$ detected by the outside air temperature sensor 31 in conjunction with a predetermined characteristic curve including three linear functions (explained in more detail hereinafter).

The numeral 42 denotes a basic outlet duct air temperature calculating unit including a second memory unit 421 to calculate a basic outlet duct air temperature $T_{ACO}$ on the basis of equation (3) and the values of the comfortable passenger compartment air temperature $T_O'$ corrected by the preset temperature correction unit 41 and the outside air temperature $T_A$ detected by the outside air temperature sensor 31.

The numeral 43 denotes an outlet duct air temperature correction calculating unit including a third memory 431 to calculate an outlet duct air temperature correction $\Delta T$ on the basis of equation (5) and the values of the comfortable passenger compartment air temperature $T_O'$ calculated by the preset temperature correction unit 41 and the passenger compartment air temperature $T_P$ detected by the passenger compartment air temperature sensor 32.

The numeral 44 denotes an adder to add the basic outlet duct air temperature $T_{ACO}$ calculated by the basic outlet duct air temperature calculating unit 40 and the outlet duct air temperature correction $\Delta T$ calculated by the correction outlet duct air temperature calculating unit 43 in order to obtain a target outlet duct air temperature $T_{AC}$, as specified in equation (4).

The numeral 45 denotes an air mix door open percentage calculating unit to calculate an appropriate air mix door opening percentage X on the basis of the target outlet duct air temperature $T_{AC}$, the passenger compartment air temperature $T_P$, and the air introduction mode.

The numeral 46 denotes a digital-analog converter for converting the calculated digital air mix door open percentage signal X into a corresponding analog signal, the numeral 47 denotes a comparator to compare the air mix door opening percentage X thus converted with the current value of the air mix door open percentage $X'$ detected by the air mix door open percentage sensor 33, and the numeral 48 denotes an actuator which corresponds to the actuator 11 of FIG. 1, for adjusting the air mix door position in response to the signal outputted from the comparator 47.

There now follows a description of the operation of the air conditioning system thus constructed.

When a signal indicative of a preset passenger compartment air temperature $T_O$ preset by the passenger compartment presetting device 30 and a signal indicative of an outside-air temperature $T_A$ detected by the outside-air temperature sensor 30 are inputted to the preset temperature correction unit 41 after being converted into the corresponding digital signals, the calculating unit 41 calculates a comfortable passenger compartment air temperature $T_O'$ on the basis of the above-mentioned two signals $T_O$ and $T_A$ in accordance with a predetermined curve characteristic of the relationship between comfortable passenger compartment air temperature $T_O'$ and the detected outside-air temperature $T_A$.

Figure 4:
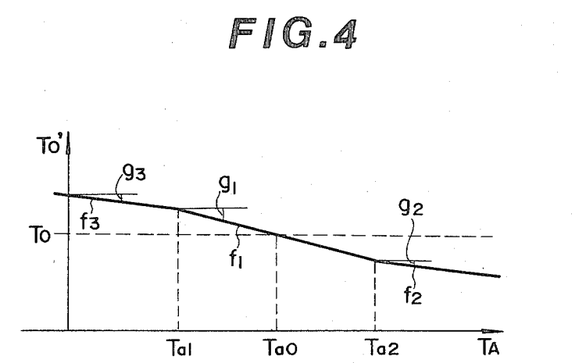
FIG. 4 is a graphical representation of relationship between passenger compartment air temperature and outside-air temperature.

As depicted in FIG. 4, the characteristic curve is formed by three linear functions relating $T_O'$ to $T_A$ having two points of intersection $T_{a1}$ and $T_{a2}$. The first linear function $f_1$ covering outside air temperature between the first intersection point $T_{a1}$ at the lower temperature end and the second intersection point $T_{a2}$ at the higher temperature end has a first negative gradient $g_1$; the second linear function $f_2$ covering outside-air temperature more than the second intersection point $T_{a2}$ has a second negative gradient $g_2$ smaller than the first one $g_1$ in absolute value; the third linear function $f_3$ covering outside-air temperature less than the first intersection point $T_{a1}$ has a third negative gradient $g_3$ also smaller than the first gradient $g_1$ in absolute value with almost the same value as that of the second linear function $f_2$.

Figure 5:
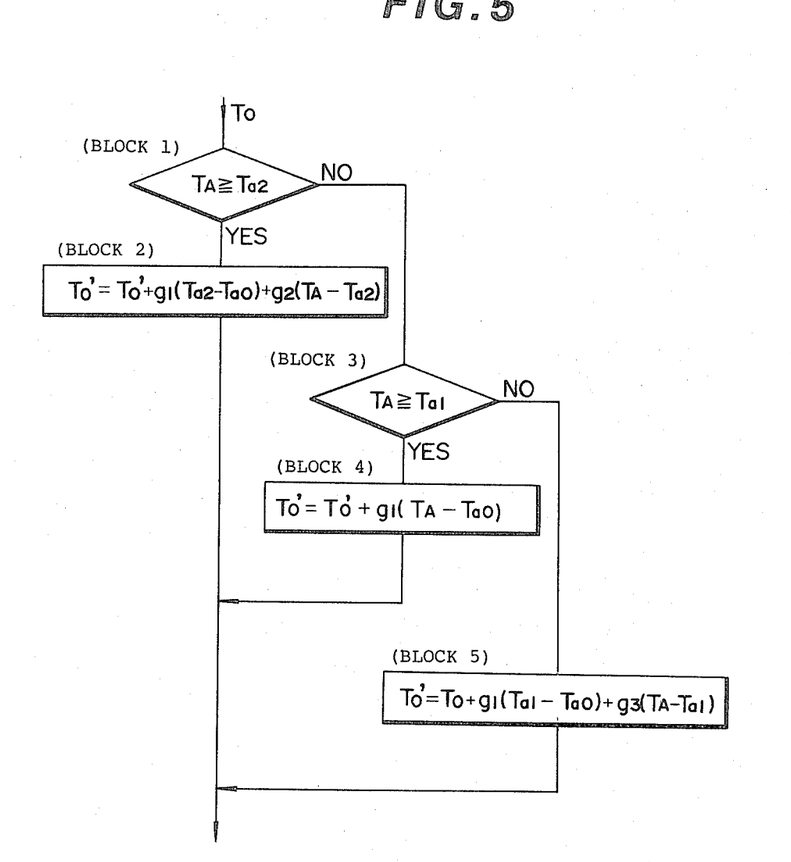
FIG. 5 is a flowchart showing the calculation steps executed to obtain a comfortable passenger compartment air temperature on the basis of the graphical representation of FIG. 4.

The steps of calculating the comfortable passenger compartment air temperature $T_O'$ according to the outside-air temperature $T_A$ are described below with reference to FIG. 5:

First, the detected outside air temperature $T_A$ is compared with the second intersection point $T_{a2}$ (BLOCK 1). If $T_A$ is greater than $T_{a2}$, $T_O'$ is calculated by substituting $T_A$ into the following equation stored in the first memory unit 411 (BLOCK 2):

$$T_O' = T_O + g_1(T_{a2} - T_{a0}) + g_2(T_A - T_{a2}) \quad (6)$$

where $T_O$ is the passenger compartment air temperature preset by the passenger compartment air temperature preset device, $T_{a0}$ is a temperature representative of a point of intersection of the first linear function and the preset passenger compartment air temperature $T_O$, and $g_1$ and $g_2$ are the gradients of the linear functions $f_1$ and $f_2$ previously stored in the first memory unit 411.

If $T_A$ is not greater than $T_{a2}$, that is, if $T_A$ is less than or equal to $T_{a2}$, $T_A$ is next compared with $T_{a1}$ (BLOCK 3).

If $T_A$ is greater than $T_{a1}$, $T_O'$ is calculated by substituting $T_A$ into the following equation stored in the first memory 411 (BLOCK 4):

$$T_O' + T_O + g_1(T_A - T_{a0}) \quad (7)$$

If $T_A$ is not greater than $T_{a1}$, that is, if $T_A$ is less than or equal to $T_{a1}$, $T_O'$ is calculated by substituting $T_A$ in the following equation stored in the first memory 411 (BLOCK 5):

$$T_O' = T_O + g_1(T_{a1} - T_{a0}) + g_3(T_A - T_{a1}) \quad (8)$$

where $g_3$ is the gradient of the linear function $f_3$ previously stored in the first memory unit 411.

When a signal indicative of the comfortable passenger compartment air temperature $T_O'$ and a signal indicative of the outside-air temperature $T_A$ are input to the basic outlet duct air temperature calculating unit 42, the calculating unit 42 calculates a basic outlet duct air temperature $T_{ACO}$ in accordance with a first equation stored in the second memory unit 421:

$$T_{ACO} = aT_O' + bT_A + cT_S + d$$

which is the same as equation (3) already described with the exception that $T_O'$ is substituted for $T_O$. In this case, the constants a, b, c, and d and $T_S$ (temperature increase due to solar heat) are stored in the second memory 421.

When a signal indicative of the comfortable passenger compartment air temperature $T_O'$ and a signal indicative of the passenger air compartment temperature $T_P$ detected by the passenger compartment sensor 32 and converted into the corresponding digital signal by the A-D converter 34 are input to the outlet duct air temperature correction unit 43, the unit 43 calculates an outlet duct air temperature correction $\Delta T$ in accordance with a second equation stored in the third memory unit 431:

$$\Delta T = a(T_O' - T_P)$$

which is the same as the equation (5) already described with the exception that $T_O'$ is substituted for $T_O$.

When a signal indicative of the basic outlet duct air temperature $T_{ACO}$ and a signal indicative of the outlet duct air temperature correction $\Delta T$ are input to the adder 44, the two signals $T_{ACO}$ and $\Delta T$ are added, so that a signal indicative of a target outlet duct air temperature $T_{AC}$ can be obtained in accordance with a third equation stored in the fourth memory unit 451:

$$T_{AC} = T_{ACO} + \Delta T$$

which is the same as the equation (4) already described.

When a signal indicative of the target outlet duct air temperature $T_{AC}$ is input to the air mix door open percentage calculating unit 45, the unit 45 calculates an air mix door opening percentage X according to the calculated target outlet duct air temperature $T_{AC}$ in accordance with a proportion expression. In this case, an outlet duct air temperature $T_H$ when the air mix door is fully open and an outlet duct air temperature $T_L$ when the air mix door is fully closed are used in conjunction with the target outlet duct air temperature $T_{AC}$. The above-mentioned fully-open air temperature $T_H$ and fully-closed air temperature $T_L$ are obtained from characteristic curves representative of relationships between outlet duct air temperature $T_{AC}$ and air mix door opening percentage X, which vary with respect to air introduction mode, that is, outside-air introduction mode and inside-air recirculation mode, and are stored in a fourth memory unit 451 in the air mix door opening percentage calculating unit 45.

FIG. 6(A) shows the first relationships between outlet duct air temperature $T_{AC}$ and air mix door opening percentage X in the outside air introduction mode, the characteristics of which change in the direction of the arrow when passenger compartment air temperature $T_P$ detected by the passenger compartment air sensor 32 increases, that is, which vary with respect to passenger compartment air temperature $T_P$. The figure labels the outlet duct air temperature $T_L$ when the air mix door is fully closed as $T_{A1}$ and the outlet duct air temperature $T_H$ when the air mix door is fully open as $T_{A2}$.

FIG. 6(B) shows the analogous characteristics in the inside-air recirculation mode, the characteristics of which also vary in the direction of the arrow with respect to passenger compartment air temperature detected by the passenger compartment air sensor 32. The figure labels $T_L$ as $T_{R1}$ and $T_H$ as $T_{R2}$.

The above two characteristics are selected, respectively, when a signal indicative of whether the air introduction mode is in the outside-air introduction mode or in the inside-air recirculation mode is inputted from the air intake door switch 35 and a signal $T_P$ is inputted from the passenger compartment air temperature sensor (32) to the air mix door opening percentage calculating unit 45.

Figure 6:
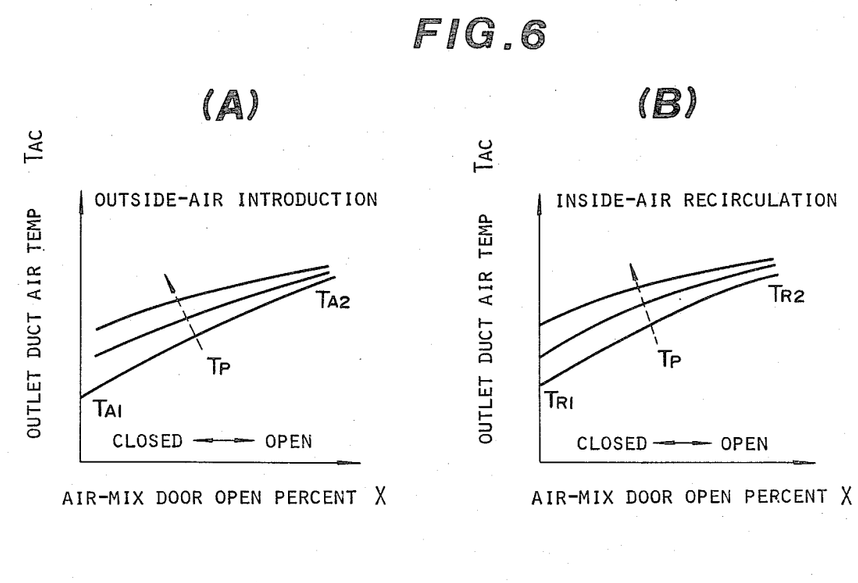
FIG. 6(A) is a graphical representation of relationship between outlet duct air temperature and air mix door opening percentage in outside-air introduction mode.
FIG. 6(B) is a graphical representation of relationship between outlet duct air temperature and air mix door opening percentage in inside-air recirculation mode.

The characteristic curves of FIGS. 6A and 6B can be stored in their entirety in the memory 451. In this case, opening percentage X can be retrieved directly from the memory 451 by the calculating unit 45 by comparing the values $T_{AC}$ and $T_P$ and the air introduction condition with the stored curves. However, this method requires a relatively large memory 451. Memory requirements can be reduced greatly by assuming the curves of FIG. 6 to be linear, and deriving the opening percentage X using the end points $T_L$ and $T_H$, which can be retrieved from the memory 451. In this case after the target outlet duct air temperature $T_{AC}$ has been calculated by the target outlet duct air temperature calculating unit 45, the opening percentage of the air mix door can be calculated in the air mix door opening percentage calculating unit in accordance with the following proportion expression.

$$X = \left(1 - \frac{T_{AC} - T_H}{T_L - T_H}\right) \times 100\% \quad (7)$$

where $T_H$ is the outlet duct air temperature when the air mix door is fully open, $T_L$ is the outlet duct air temperature when the air mix door is fully closed.

A more detailed description of the method of calculating the air mix door opening percentage X is made in another Application titled AIR-CONDITIONING METHOD AND SYSTEM FOR AN AUTOMOTIVE VEHICLE, Ser. No. 317,861, which was invented by the same inventors and filed concurrently on Nov. 3, 1981.

After the above-mentioned calculation has been completed in accordance with the proportion expression, the calculated air mix door opening percentage X is compared with the analog signal corresponding to the air mix door opening percentage signal X' detected by the air mix door opening percentage sensor 33 by the comparator 47 after D-A converted by the converter 46. If the two opening percentage signals do not coincide, a drive signal is output to the actuator 48. Concretely, the actuator driver 48 is a device such as two solenoid values 14 and 15 of FIG. 1. The actuator 48 adjusts the opening percentage of the air mix door 5 of FIG. 1.

The calculating units 41, 42, 43 and 45 may be fabricated using discrete components in accordance with the equations described hereinabove. A programmable digital computer may also be utilized as explained below.

Figure 3B:
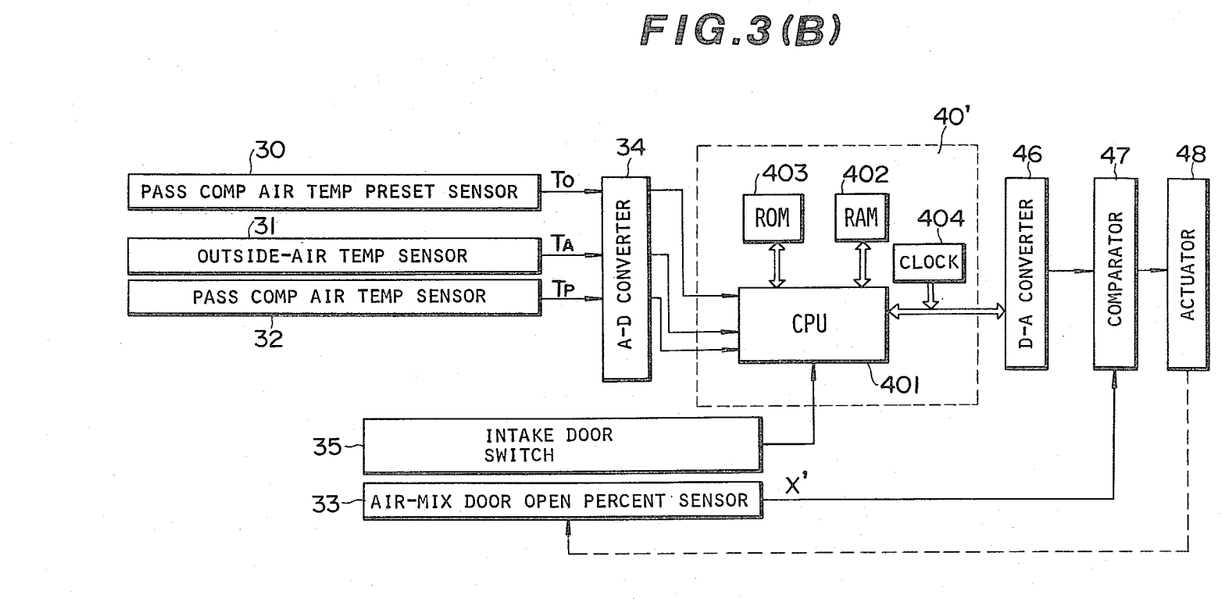
FIG. 3(B) is a schematic block diagram of a second embodiment of the air conditioning system of the present invention.

FIG. 3(B) is a schematic block diagram of a second embodiment of the air conditioning system according to the present invention, in which a microcomputer is used as a specific implementation the arithmetical control unit 40 of FIG. 3(A).

In the figure, the numeral 40' denotes an arithmetical control unit of a microcomputer having a central processing unit (CPU) 401 to execute various arithmetic operations in accordance with programs, a read-only memory (ROM) 402 in which to store necessary programs, and a random-access memory (RAM) 403 in which various calculated results are stored during execution of necessary arithmetical operations and a clock signal generator 404 which provides a high-frequency clock pulse signal for timing.

In the same manner as in FIG. 3(A), a signal $T_O$ indicative of the temperature preset by the passenger compartment air temperature presetting device 30, a signal $T_A$ indicative of the outside-air temperature detected by the outside-air temperature sensor 31, and a signal $T_P$ indicative of the passenger compartment air temperature detected by the passenger compartment air temperature sensor 32, are all inputted to the CPU after having been converted by the A-D converter 34 from analog signal to corresponding digital signals.

On the other hand, a signal indicative of air mix door opening percentage X' detected by the air mix door opening percentage sensor 33 is directly inputted to the comparator 47.

When the above-mentioned signals are input to the CPU 401, the CPU 401 first calculates the comfortable passenger compartment air temperature $T_O'$ on the basis of the outside-air temperature $T_A$ detected by the outside air temperature sensor 31 and the desired passenger compartment air temperature $T_O$ preset by the passenger compartment air temperature preset device 30 in accordance with a predetermined characteristic curve stored in the read-only memory 403, the characteristic curve being formed by three linear functions having two points of intersection as previously described.

Secondly, the CPU calculates the basic outlet duct air temperature $T_{ACO}$ on the basis of the comfortable passenger compartment air temperature $T_O'$ already calculated and the outside-air temperature $T_A$ detected by the outside-air temperature sensor 31 in accordance with the first equation stored in the read only memory 403, the first equation being $$T_{ACO} = dT_O' + eT_A + fT_S + g$$

Thirdly, the CPU calculates the outlet duct air temperature correction $\Delta T$ on the basis of the comfortable passenger compartment air temperature $T_O'$ already calculated and the passenger compartment air temperature $T_P$ detected by the passenger compartment air temperature sensor 32 in accordance with a second equation stored in said read-only memory 403, the second equation being $$\Delta T = d(T_P - T_O')$$

Fourthly, the CPU adds the basic outlet duct air temperature $T_{ACO}$ already calculated and the outlet duct air temperature correction $\Delta T$ already calculated to obtain the target outlet duct air temperature $T_{AC}$.

Finally, the CPU calculates the air mix door opening percentage X required to produce the target outlet duct air temperature $T_{AC}$ by comparing the current calculated value of target outlet duct air temperature $T_{AC}$ and the current detected value of passenger compartment air temperature $T_P$ with ROM-stored characteristic curves of the predetermined relationships of outlet duct air temperature $T_{AC}$, passenger compartment air temperature $T_P$ and air introduction mode to air mix door opening percentage X.

The calculated air mix door opening percentage X is compared to the air mix door opening percentage X', detected by the air mix door sensor 33, by the comparator 47, after the digital signal corresponding to the air mix door opening percentage X is converted to an analog signal by the D-A converter 46. And, if the two opening percentage signals do not coincide, a drive signal is output to the actuator 48, so that the air mix door position can be adjusted.

As described above, in the air conditioning system according to the present invention, since a passenger compartment air temperature $T_O$ preset by the passenger compartment air temperature preset device is corrected to a comfortable temperature according to the outside-air temperature, the temperature of air within the passenger compartment can be maintained at a comfortable temperature in any season without passenger adjustment.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. An air conditioning method for an automotive vehicle air-conditioning system in which the passenger compartment air temperature is maintained at a comfortable temperature according to the outside air temperature, which comprises the following steps of:
    (a) detecting air temperature at a plurality of locations, including at least outside air temperature $T_A$ and passenger compartment air temperature $T_P$;
    (b) determining a desired passenger compartment air temperature $T_O$ preset by a passenger compartment air temperature preset device;
    (c) calculating a comfortable passenger compartment air temperature $T_O'$ according to the outside air temperature $T_A$ in accordance with a predetermined relationship between comfortable passenger compartment air temperature $T_O'$ and detected outside-air temperature $T_A$;
    (d) calculating a basic outlet duct air temperature $T_{ACO}$ by substituting the current values of outside air temperature $T_A$, passenger compartment air temperature $T_P$, and comfortable passenger compartment air temperature $T_O'$ into a predetermined first equation and solving the equation arithmetically for $T_{ACO}$;
    (e) calculating an outlet duct air temperature correction $\Delta T$ by substituting the current values of outside air temperature $T_A$ and comfortable passenger compartment air temperature $T_O'$ into a second predetermined equation and solving the equation arithmetically for $\Delta T$;
    (f) adding the calculated basic outlet duct air temperature $T_{ACO}$ and the calculated outlet duct air temperature correction $\Delta T$ to obtain a required target outlet duct air temperature $T_{AC}$;
    (g) detecting whether air introduced into the air conditioner is from outside the vehicle or from within the passenger compartment, these two possibilities being referred to as air introduction modes;
    (h) calculating an air mix door opening percentage X required to produce outlet duct air at the target temperature $T_{AC}$ by comparing the current calculated value of target outlet duct air temperature $T_{AC}$, and the current detected value of passenger compartment temperature $T_P$, with stored characteristic curves of the predetermined relationships of outlet duct air temperature $T_{AC}$, air introduction mode and passenger compartment air temperature $T_P$ to air mix door opening percentage X; and
    (i) positioning the air mix door in accordance with the calculated value of X.

2. An air conditioning method for an automotive vehicle air-conditioning system in which the passenger compartment air temperature is controlled at a comfortable temperature according to the outside air temperature as set forth in claim 1, wherein the predetermined relationship between comfortable passenger compartment air temperature $T_O'$ and the detected outside air temperature $T_A$ includes three linear functions having two points of intersection $Ta_1$ and $Ta_2$, the first linear function covering outside air temperature between the first intersection point $Ta_1$ and the second intersection point $Ta_2$ and having a first negative gradient $g_1$, the second linear function covering outside-air temperature greater than the second intersection point $Ta_2$ and having a second negative gradient $g_2$ smaller than the first gradient $g_1$ in absolute value, the third linear function covering outside air temperature less than the first intersection point $Ta_1$ and having a third negative gradient $g_3$ smaller than the first gradient $g_1$ in absolute value with almost the same value as that of the second linear function.

3. An air conditioning method for an automotive vehicle air-conditioning system in which the passenger compartment air temperature is controlled at a comfortable temperature according to the outside air temperature as set forth in claim 2, wherein the step of calculating the comfortable passenger compartment air temperature $T_O'$ according to the outside-air temperature $T_A$ in accordance with a predetermined relationship of three linear functions having two points of intersection $Ta_1$ and $Ta_2$ comprises the following steps of:
    (a) comparing the detected outside air temperature $T_A$ with the second intersection point $Ta_2$;
    (b) if the detected outside air temperature $T_A$ is greater than the second intersection point $Ta_2$, calculating the comfortable passenger compartment air temperature $T_O'$ according to the outside air temperature $T_A$ by substituting the current value of outside-air temperature $T_A$ into the following equation:

$$T_O' = T_O + g_1(Ta_2 - Ta_0) + g_2(T_A - Ta_2)$$

where $T_O$ is the passenger compartment air temperature preset by said passenger compartment air temperature preset device, $Ta_0$ is the temperature representative of a point of intersection of the first linear function and a line representing a constant preset passenger compartment air temperature $T_O$, and $g_1$ and $g_2$ are the gradients of the first and second linear functions;
    (c) if not greater, that is, if the detected outside air temperature $T_A$ is less than or equal to the second intersection point $Ta_2$, comparing the detected outside air temperature $T_A$ with the first intersection point $Ta_1$;
    (d) if the detected outside air temperature $T_A$ is greater than the first intersection point $Ta_1$, calculating the comfortable passenger compartment air temperature $T_O'$ according to the outside air temperature $T_A$ by substituting the current value of outside air temperature $T_A$ in the following equation:

$$T_O' = T_O + g_1(T_A - T_{a0})$$

(e) if not greater, that is, if the detected outside air temperature $T_A$ is less than or equal to the first intersection point $T_{a1}$, calculating the comfortable passenger compartment air temperature $T_O'$ according to the outside air temperature $T_A$ by substituting the current value of outside air temperature $T_A$ into the following equation:

$$T_O' = T_O + g_1(T_{a1} - T_{a0}) + g_3(T_A - T_{a1})$$

where $g_3$ is the gradient of the third linear function.

4. An air conditioning method for an automotive vehicle air-conditioning system in which the passenger compartment air temperature is controlled at a comfortable temperature according to the outside air temperature as set forth in claim 1, wherein the predetermined first equation to calculate the required basic outlet duct air temperature $T_{ACO}$ is:

$$T_{ACO} = aT_O' + bT_A + cT_S + d$$

where $T_O'$ is the calculated comfortable passenger compartment air temperature, $T_A$ is the detected outside-air temperature, $T_S$ is the increase in passenger compartment air temperature due to solar heat, and a, b, c, and d are constants.

5. An air conditioning method for an automotive vehicle air-conditioning system in which the passenger compartment air temperature is controlled at a comfortable temperature according to the outside air temperature as set forth in claim 1, wherein the predetermined second equation to calculate the outlet duct air temperature correction $\Delta T$ is:

$$\Delta T = a(T_P - T_O')$$

where $T_P$ is the detected passenger compartment air temperature, $T_O'$ is the comfortable passenger compartment air temperature, and a is a constant.

6. An air conditioning method for an automotive vehicle air-conditioning system in which the passenger compartment air temperature is controlled at a comfortable temperature according to the outside air temperature as set forth in claim 1, wherein the step of calculating an air mix door opening percentage X comprises the following steps:
(a) storing only the endpoints of the characteristic curves of the determined relationship of outlet duct air temperature $T_{AC}$, passenger compartment air temperature $T_P$ and air introduction condition to air mix door opening percentage X;
(b) selecting one of a plurality of the predetermined characteristic curves in response to the passenger compartment air temperature $T_P$ and the determined air introduction condition;
(c) retrieving the stored values of a first endpoint outlet duct air temperature $T_L$ when the air mix door is fully closed and a second endpoint outlet duct air temperature $T_H$ when the air mix door is fully open from the determined characteristic curve; and
(d) calculating the air mix door opening percentage X from the values of the current calculated outlet duct air temperature $T_{AC}$, and a first and a second endpoint outlet duct air temperatures $T_L$ and $T_H$ according to the following equation:

$$X = \left(1 - \frac{T_{AC} - T_H}{T_L - T_H}\right) \times 100\%$$

7. An air conditioning method for an automotive vehicle air-conditioning system in which the passenger compartment air temperature is controlled at a comfortable temperature according to the outside air temperature as set forth in claim 1, wherein the step of positioning the air mix door comprises the steps of:
(a) detecting the current value of the air mix door opening percentage X';
(b) comparing the calculated value of the air mix door opening percentage X with the detected value X';
(c) generating an actuator drive signal proportional to the difference between the detected value X' and the calculated value X; and
(d) adjusting an air mix door opening actuator by an amount commensurate with the actuator drive signal,
whereby the position of the air mix door is adjusted according to the calculated value of air mix door opening percentage X.

8. An air-conditioning system for an automotive vehicle in which the passenger compartment air temperature is controlled at comfortable temperature according to the outside air temperature and operative in air introduction modes of outside air introduction and inside air recirculation, which comprises:
(a) a passenger compartment air temperature presetting device;
(b) an outside-air temperature sensor;
(c) a passenger compartment air temperature sensor;
(d) an air mix door opening percentage sensor means for detecting the opening percentage of an air mix door;
(e) an air intake door switch means for detecting whether the mode of air introduction is the outside air introduction mode or inside air recirculation mode;
(f) a preset temperature correction means, including a first memory unit, for calculating the comfortable passenger compartment air temperature $T_O'$ on the basis of the outside-air temperature $T_A$ detected by said outside-air temperature sensor and the desired passenger compartment air temperature $T_O$ preset by said passenger compartment air temperature presetting device in accordance with a predetermined relationship between comfortable passenger compartment air temperature $T_O'$ and the detected outside air temperature $T_A$ previously stored in said first memory unit, the relationship being defined by three linear functions having two points of intersection;
(g) a basic outlet duct air temperature calculating means, including a second memory unit, for calculating the basic outlet duct air temperature $T_{ACO}$ on the basis of the comfortable passenger compartment air temperature $T_O'$ calculated by said preset temperature correction means and the outside-air temperature $T_A$ detected by said outside-air temperature sensor in accordance with a first equation, the first equation being:

$$T_{ACO} = dT_O' + eT_A + fT_S + g$$

where d, e, f, g and $T_S$ are predetermined constants stored in the second memory unit;

(h) an outlet duct air temperature correction calculating means, including a third memory unit, for calculating the outlet duct air temperature correction $\Delta T$ on the basis of the comfortable passenger compartment air temperature $T_O'$ calculated by said preset temperature correction means and the passenger compartment air temperature $T_P$ detected by said passenger compartment air temperature sensor in accordance with a second equation, the second equation being:

$$\Delta T = d(T_P - T_O')$$

where $T_P$ is the temperature detected by the passenger compartment air temperature sensor;

(i) an adder means for adding the basic outlet duct air temperature $T_{ACO}$ calculated by said basic outlet duct air temperature calculating means and the outlet duct air temperature correction $\Delta T$ calculated by said outlet duct air temperature correction calculating means to obtain the target outlet duct air temperature $T_{AC}$;

(j) an air mix door opening percentage calculating means, including a fourth memory therewithin, for calculating the air mix door opening percentage X required to produce outlet duct air at target temperature $T_{AC}$ by comparing the current calculated value of target outlet duct air temperature $T_{AC}$ and the current detected value of passenger compartment temperature $T_P$ with stored characteristic curves of the predetermined relationships of outlet duct air temperature $T_{AC}$, air introduction mode and passenger compartment air temperature $T_P$ to air mix door opening percentage X;

(k) a comparator means for comparing the calculated air mix door opening percentage X obtained by said air mix door opening percentage calculating means with an air mix door opening percentage X' detected by said air mix door opening percentage sensor means, said comparator means outputting a signal representative of the comparison; and (l) an actuator means for adjusting the position of the air mix door in response to the signal output from said comparator means.

9. An air-conditioning system for an automotive vehicle in which the passenger compartment air temperature is controlled at a comfortable temperature according to the outside air temperature and operative in air introduction modes of outside air introduction and inside air recirculation, which comprises;

(a) a passenger compartment air temperature presetting device;
(b) an outside-air temperature sensor;
(c) a passenger compartment air temperature sensor;
(d) an air mix door opening percentage sensor means for detecting the opening percentage of an air mix door;
(e) an air intake door switch means for detecting whether the mode of air introduction is the outside air introduction mode or the inside air recirculation mode;
(f) a microcomputer which includes:

(1) a central processing unit means for executing various arithmetic operations in accordance with programs;
(2) a read-only memory means for storing programs;
(3) a random-access memory means for storing calculated results produced by said central processing unit means during execution of arithmetic operations in accordance with the program stored in said read-only memory means; and
(4) a clock signal generator means for providing a high-frequency clock timing pulse signal, said central processing unit means first calculating the comfortable passenger compartment air temperature $T_O'$ on the basis of the outside-air temperature $T_A$ detected by said outside air temperature sensor and the desired passenger compartment air temperature $T_O$ preset by said passenger compartment air temperature preset device in accordance with a predetermined relationship between comfortable passenger compartment air temperature $T_O'$ and the detected outside air temperature $T_A$ previously stored in said read-only memory means, the relationship being defined by three linear functions having two points of intersection, secondly calculating the basic outlet duct air temperature $T_{ACO}$ on the basis of the comfortable passenger compartment air temperature $T_O'$ already calculated and the outside-air temperature $T_A$ detected by said outside-air temperature sensor in accordance with a first equation stored in said read-only memory means, the first equation being $$T_{ACO} = aT_O' + bT_A + cT_S + d$$

where a, b, c, d and $T_S$ are predetermined constants stored in said read-only memory means, thirdly calculating the outlet duct air temperature correction $\Delta T$ on the basis of the comfortable passenger compartment air temperature $T_O'$ already calculated and the passenger compartment air temperature $T_P$ detected by said passenger compartment air temperature sensor in accordance with a second equation stored in said read-only memory means, the second equation being $$\Delta T = a(T_P - T_O')$$

fourthly adding the basic outlet duct air temperature $T_{ACO}$ already calculated and the outlet duct air temperature correction $\Delta T$ already calculated to obtain the target outlet duct air temperature $T_{AC}$, finally calculating the air mix door opening percentage X required to produce the target outlet duct air temperature $T_{AC}$ by comparing the current calculated value of target outlet duct air temperature $T_{AC}$ and the current detected value of passenger compartment air temperature $T_P$ with ROM-stored characteristic curves of the predetermined relationships of outlet duct air temperature $T_{AC}$, air introduction mode and passenger compartment air temperature $T_P$ to air mix door opening percentage X;

(g) a comparator means for comparing the calculated air mix door opening percentage X obtained by said central processing unit means with the air mix door opening percentage X' detected by said air mix door opening percentage sensor means;

(h) an air mix door actuator means responsive to said comparator means for positioning the air mix door in response to a signal output from an air mix door actuator driver.

10. An air-conditioning system for an automotive vehicle in which the passenger compartment air temperature is controlled at a comfortable temperature according to the outside air temperature as set forth in either claim 8 or 9, which further comprises:
 (a) an A-D converter means for converting analog signals from said passenger compartment air temperature presetting device, said outside-air temperature sensor, and said passenger compartment air temperature sensor, respectively, into corresponding digital signals, said A-D converter being disposed immediately after said passenger compartment air temperature presetting device, and said two sensors; and
 (b) a D-A converter for converting a digital signal representing said calculated air mix door opening percentage into an analog signal, the converted analog signal being input to said comparator means.

11. An air-conditioning system for an automotive vehicle comprising:
 (1) a cooling unit
 (2) a heating unit
 (3) air conduit means for feeding air from an intake duct to an outlet duct and into a passenger compartment of the vehicle,
 (4) an air mix door
 (5) said cooling unit operative for cooling air passing from said intake duct to said outlet duct,
 (6) said heating unit operative for heating air passing from said intake duct to said outlet duct in proportion to the amount of opening of said air mix door,
 (7) an air intake door operative in a fresh air position for opening said intake duct to air outside said passenger compartment and operative in a recirculating air position for opening said air intake duct to air inside said passenger compartment,
 (8) a passenger compartment air temperature presetting device operative for generating a first signal;
 (9) an outside-air temperature sensor operative for generating a second signal;
 (10) a passenger compartment air temperature sensor operative for generating a third signal;
 (11) an air mix door opening sensor means for detecting the amount of opening of the air mix door and for generating a fourth signal corresponding thereto;
 (12) an air intake door switch for detecting the position of said air intake door and generating a fifth signal corresponding thereto;
 (13) a microcomputer connected to receive digital signals corresponding to said first through fifth signals and including:
  (a) a central processing unit means for executing programs;
  (b) a read-only memory means for storing said programs; and
  (c) a random-access memory means for storing results produced by said central processing unit means in accordance with the programs stored in said read-only memory means;
 said central processing unit means operative in response to said stored programs and said first and second signals for calculating a comfortable passenger compartment air temperature $T_O'$;
 said central processing unit means operative in response to said stored programs and to said second and third signals for calculating a target outlet duct air temperature $T_{AC}$ on the basis of a predetermined function involving the calculated comfortable passenger compartment temperature $T_O'$, the outside-air temperature $T_A$ corresponding to said second signal, and the passenger compartment air temperature $T_P$ corresponding to said third signal, and for further calculating an air mix door opening amount X in response to said calculated target outlet duct air temperature $T_{AC}$ and said third and fifth signals;
 (14) said central processing unit means operative for comparing the calculated air mix door opening amount X with the air mix door opening amount X' corresponding to said fourth signal, and for generating a control signal if the amount X is different from X';
 (15) an air mix door actuator means for positioning the air mix door in response to output signals from said central processing unit means;
 whereby the outlet duct air temperature is controlled by controlling said air mix door.

12. An air-conditioning system for an automotive vehicle comprising:
 (1) a cooling unit
 (2) a heating unit
 (3) air conduit means for feeding air from an intake duct to an outlet duct and into a passenger compartment of the vehicle,
 (4) an air mix door
 (5) said cooling unit operative to cool air passing from said intake duct to said outlet duct,
 (6) said heating unit operative for heating air passing from said intake duct to said outlet duct in proportion to the amount of opening of said air mix door,
 (7) an air intake door operative in a fresh air position for opening said intake duct to air outside said passenger compartment and operative in a recirculating air position for opening said air intake duct to air inside said passenger compartment,
 (8) a passenger compartment air temperature presetting device operative for generating a first signal;
 (9) an outside-air temperature sensor operative for generating a second signal;
 (10) a passenger compartment air temperature sensor operative for generating a third signal;
 (11) an air mix door opening sensor means for detecting the amount of opening of the air mix door and for generating a fourth signal corresponding thereto;
 (12) an air intake door switch means for detecting the position of said air intake door and for generating a fifth signal corresponding thereto;
 (13) electronic signal processing means responsive to said first through fifth signals for generating a control signal to control an opening amount of said air mix door thereby to control the temperature within the compartment, said processing means being responsive to said second signal corresponding to outside air temperature to adjust the temperature at which the air within the compartment in inverse proportion thereto, so that the seasonal change of passenger temperature comfort perception is automatically taken into account;
 (14) actuator means responsive to said control signal and connected to said air mix door to control the amount of opening of said air mix door.

* * * * *